United States Patent
Siahmakoun et al.

(10) Patent No.: US 8,089,381 B2
(45) Date of Patent: Jan. 3, 2012

(54) PHOTONIC D/A

(76) Inventors: Azad Siahmakoun, Terre Haute, IN (US); Sergio Carlos Granieri, Terre Haute, IN (US); Michael Ryan Gehl, Terre Haute, IN (US)

(*) Notice: Subject to any disclaimer, the term of this patent is extended or adjusted under 35 U.S.C. 154(b) by 339 days.

(21) Appl. No.: 12/475,159

(22) Filed: May 29, 2009

(65) Prior Publication Data

US 2010/0302084 A1  Dec. 2, 2010

(51) Int. Cl.
*H03M 1/00* (2006.01)
(52) U.S. Cl. ................ 341/137; 341/100; 341/144
(58) Field of Classification Search ........... 341/100, 341/137, 144
See application file for complete search history.

(56) References Cited

U.S. PATENT DOCUMENTS

| | | | |
|---|---|---|---|
| 6,873,273 B2 * | 3/2005 | Taylor et al. | 341/137 |
| 7,061,414 B2 | 6/2006 | Chen et al. | |
| 7,403,711 B2 * | 7/2008 | Chen et al. | 398/45 |
| 7,525,461 B1 * | 4/2009 | Uhlhorn | 341/137 |
| 7,564,390 B2 * | 7/2009 | Frazier et al. | 341/144 |
| 2007/0116461 A1 | 5/2007 | Chen et al. | |
| 2007/0159369 A1 * | 7/2007 | Currie et al. | 341/144 |
| 2008/0018513 A1 | 1/2008 | Frazier et al. | |

* cited by examiner

*Primary Examiner* — Khai M Nguyen

(57) ABSTRACT

An all-optical combined serial-to-parallel and digital-to-analog convertor using standard WDM technology is realized. The system is based on bit interleaving and cross-gain modulation (XGM) in a semiconductor optical amplifier (SOA). The optical system can operate on multiple-bit digital words at a very high bit rate. The analog output forms series of pulses with the amplitude of each pulse taking one of the eight discrete values. A low pass filter may be used to turn this bit stream into a continuous waveform, and thus arbitrary waveforms are generated. Unlike many current digital-to-analog converter designs, which double in size with each additional bit, the design presented here allows a linear growth in components, thus making higher bit systems practical.

16 Claims, 10 Drawing Sheets

PHOTONIC D/A

TECHNICAL FIELD

The present invention relates to optical signal processing. Further, the present invention relates to serial-to-parallel (S/P) conversion and digital-to-analog (D/A) conversion.

BACKGROUND

With increasing demands for bandwidth in communications and computing, there is an increasing need for fast signal processing systems. Two common signal processing functions are the conversion of serial data to parallel data, and the conversion of digital data to an analog signal. S/P conversion is important at the interface of computation and communication systems. Computers typically operate on parallel data, while long distance transmission is typically done through serial connections. D/A conversion is useful in the generation of arbitrary waveforms, and also in certain architectures of analog-to-digital (A/D) converters. As electrical components reach their performance limits it is becoming necessary to perform signal processing through optical methods.

Certain embodiments allow the optical transmission of serial data at rates up to 40 Gb/s across a single carrier channel. Current electrical S/P converters are only able to operate at bit rates around 2.5 Gb/s. In certain embodiments an optical method for S/P conversion has been demonstrated at rates of 1 Tb/s using a surface-reflection optical switch. This method has issues with low bit contrast ratios and crosstalk between the parallel outputs. As a result, there is still a need for new devices which can match high transmission rates, while maintaining high bit contrast, and low crosstalk.

While there has been much work in A/D conversion, D/A conversion has received less attention. Alternative embodiment has demonstrated the use of optical correlation to recognize bit patterns. This method, however, requires a separate module for each bit pattern, resulting in $2^N-1$ modules, where N is the number of bits in each digital word. Another embodiment demonstrated uses a probe pulse through a series of nonlinear optical loop mirrors which are controlled by the bit pattern. Once again the number of components in the device grows by $2^N-1$, making high resolution D/A unreasonable. There is therefore a need for high speed D/A converters which grow linearly with respect to number of bits as provided by this invention.

SUMMARY

The presented invention is an optical signal processing architecture. The architecture consists of an input stage, a splitting stage, a delay stage, a fixed attenuation stage, an optical bit-selection stage and a summing output stage. The input stage receives a digital serial data signal a(t), and performs any necessary conditioning such that the signal will be compatible with the remainder of the system, producing a signal b(t). The splitting stage splits the conditioned input, b(t), into N similar parallel signals, forming the signals $c_n(t)$ (n=1, 2, ..., N). Each of these N signals is then sent through a delay line which creates a time delay of $n \times \tau$ where $\tau$ is the period of one bit. Each signal next goes through an attenuator which controls the relative powers of the N signals. The optical bit-selection stage consists of one or more devices that produce controllable optical gain. The gain of these devices is controlled by a signal h(t) from a signal generator which is synchronized to the input signal b(t). The signal h(t) controls the gain devices in such a way as to amplify one bit and strongly attenuate the remaining bits of each digital word. The final stage controls the format of the analog output. The embodiment can be configured to output N separate channels each containing one of the N bits from the input digital word. In certain embodiments these separate channels are summed such that the output analog signal is a linear combination of the N weighted bits from the input digital word.

In certain embodiment the system is based on wavelength-division multiplexing (WDM) technology. In the input stage the incoming data is duplicated across N optical carriers at different wavelengths. The splitting stage consists of a 1×N wavelength division multiplexor which separates the N carriers. Following the fixed attenuation stage the signals are recombined and sent through a single optical bit-selection device. Finally, in the output stage the N carriers may remain combined or be separated with another 1×N wavelength-division multiplexor.

In certain embodiments, only a single optical carrier is used. The splitting stage consists of a 1×N coupler, resulting in amplitude division as opposed to wavelength division. The optical bit-selection stage consists of one optical gain device for each of the N signals. Following this stage the signals may remain separated or be combined into one or more outputs.

In certain embodiments the optical bit-selection stage is controlled by an optical signal. In this case the signal generator produces an optical signal. In other embodiments the optical bit-selection stage is controlled by an electrical signal, and the signal generator produces an electrical signal.

For the purpose of S/P conversion the fixed attenuation stage is adjusted so that each of the N parallel signals has an equal power upon reaching the output stage. Additionally the output stage is configured such that the N signals are separated. For the purpose of D/A conversion the fixed attenuation stage is adjusted such that the $n^{th}$ signal has a relative power of $2^{(n-1)}$ upon reaching the output stage. In this case the output stage is configured such that the N signals are summed together producing a single output.

DETAILED DESCRIPTION

Figure 1:
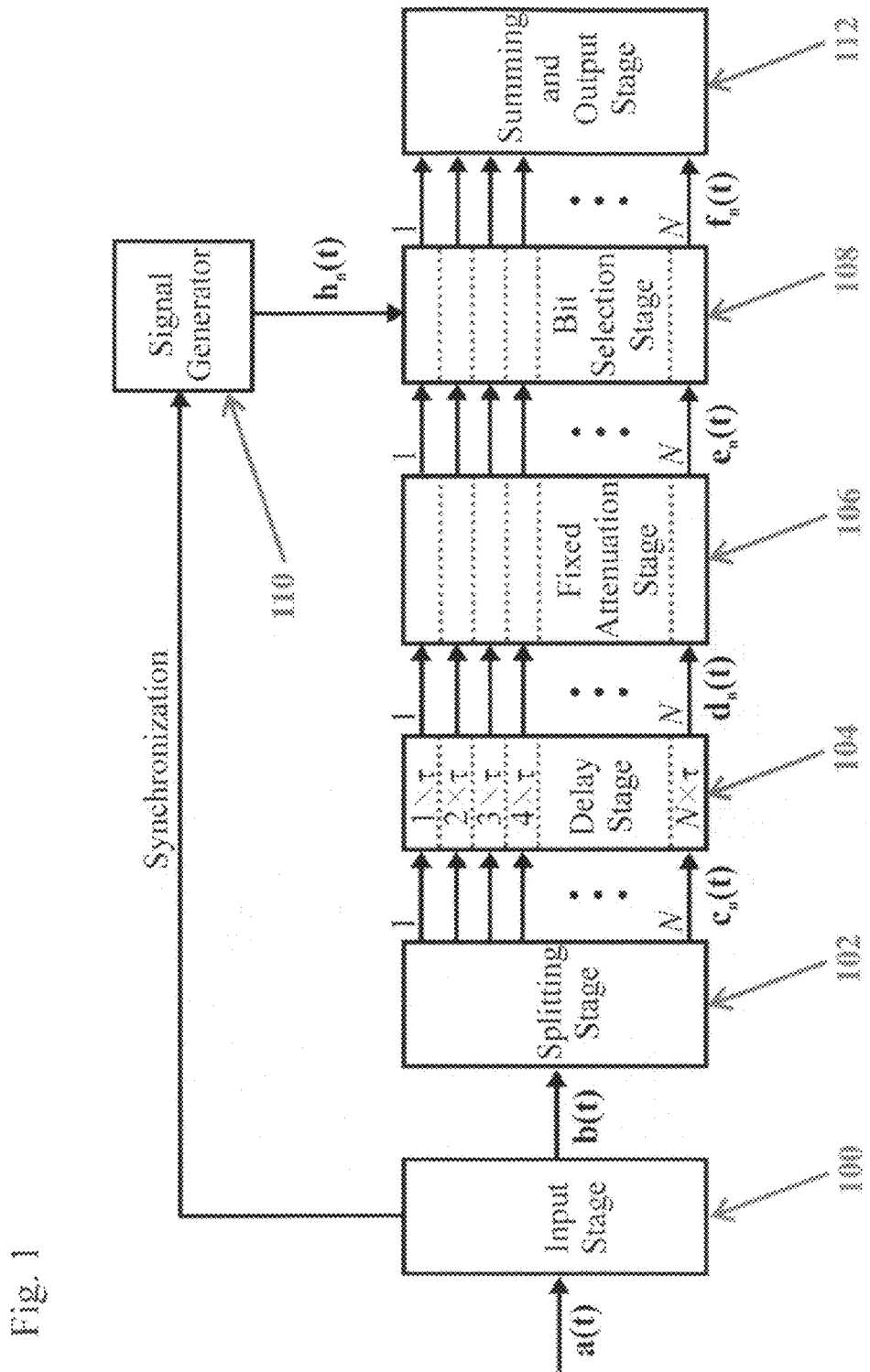
FIG. 1 is a block diagram of the optical signal processing architecture of S/P combined with D/A in accordance with the present invention.

The optical S/P-D/A signal processing architecture in accordance with the present invention is shown in general form in FIG. 1. The illustrated embodiment consists of an input stage 100, a splitting stage 102, a delay stage 104, a fixed attenuation stage 106, an optical bit-selection stage 108, a signal generator 110 and a summing output stage 112. The illustrated embodiment accepts a serial digital signal with data grouped in N-bit digital words. The output depends on the configuration of the stages within the architecture. When configured for D/A conversion the system will have a single output with the amplitude corresponding to the value of the digital word input. When configured for S/P conversion the system will have N outputs, each corresponding to a different bit of the digital word input. The proposed invention can have any number of outputs, each of which will be some linear combination of the N bits of the received digital word.

The first stage of the system, the input stage 100, receives a serial digital signal a(t). The received signal may be either electrical or optical. In the case that the received signal is electrical the input stage includes some method of electrical to optical conversion such as an electro-optic modulator. Additionally, the input stage consists of any elements necessary to condition the input signal such that it will be compatible with the rest of the system. For example, this may consist of amplification of a weak signal. The result of the input stage is the signal b(t).

The splitting stage 102 is responsible for generating N similar serial digital signals from the signal b(t), provided by the input stage. This can be accomplished by several techniques, including wavelength division or amplitude division. In the case of wavelength division the input stage will have already duplicated the input serial digital data a(t) across N different carrier wavelengths. The splitting stage then consists of any device capable of demultiplexing wavelengths, such as an arrayed waveguide grating. In the case of amplitude division the splitting stage could consist of a 1×N coupler. In any case the splitting stage generates N signals indicated by $c_n(t)$ where n ranges from 1 to N.

The delay stage 104 of the architecture consists of any device which will introduce a relative delay among the N signals created by the splitting stage. In most configurations, including D/A conversion and S/P conversion the delay stage is configured such that the signal $c_n(t)$ is delayed by $(n \times \tau_{bit} + \tau_0)$, where $\tau_{bit}$ is the period of one bit, and $\tau_0$ is some arbitrary delay common among all N signals. The output of this stage is N signals, represented by $d_n(t)$.

The next stage shown in FIG. 1 is the fixed attenuation stage 106. In practice this stage could occur at any point within the architecture where the N signals can be affected individually. The purpose of this stage is to control the relative power of the N signals. This stage consists of one or more attenuators with a fixed or slowly varying amount of attenuation. In some embodiments the amount of attenuation is set manually and remains constant during operation of the system. In other embodiments the attenuators may be controlled by a feedback loop which can vary the attenuators to compensate for any power fluctuations. In other alternative embodiments, such as the S/P convertor, the attenuators are set such that each of the N signals has an equal power upon reaching the output stage. In other configurations, such as the D/A convertor, the attenuators are set such that each signal has a different power upon reaching the output stage. In the case of a D/A convertor in which the most significant bit (MSB) of the input signal is the first to arrive in time, the attenuators are set such that the signal $d_n(t)$ has a relative power of $2^{(n-1)}$. In the case of a D/A convertor in which the least significant bit (LSB) of the input signal is the first to arrive in time, the attenuators are set such that the signal $d_n(t)$ has a relative power of $2^{(N-n)}$. Following this stage the signal will be represented by $e_n(t)$.

Figure 2:
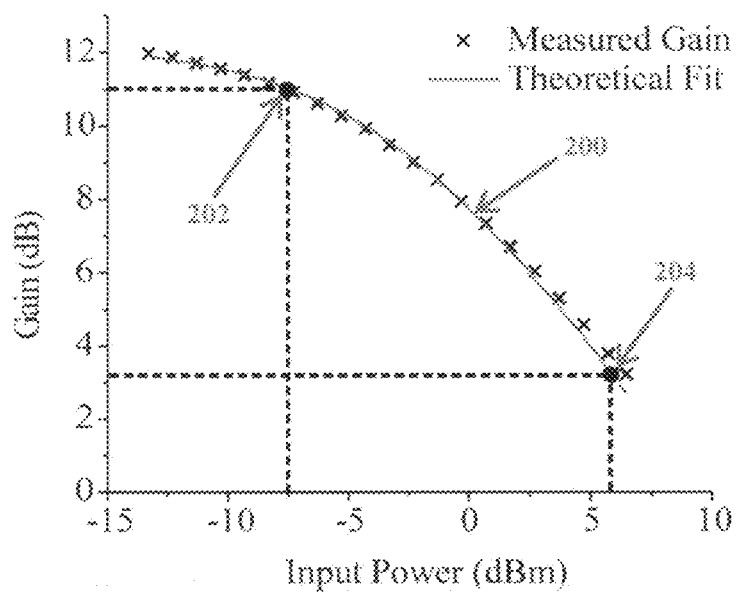
FIG. 2 is the gain curve of a semiconductor optical amplifier (SOA) at a specific wavelength as a function of total optical power input to the device where an SOA is an example of an optical variable gain device in accordance with the present invention.

The next stage of the architecture is the optical bit-selection stage 108. This stage consists of one or more devices which amplify one bit and strongly attenuate the remaining bits of each digital word dependent on an external signal h(t) produced by the signal generator 110. In most configurations the purpose of this stage is to introduce a large amount of attenuation to all but one bit out of each N-bit digital word. In some embodiments there is a separate gain device for each of the N signals. In this case each device may be controlled separately, or by a single signal. In other embodiments, such as when each of the N signals is carried on a different wavelength, the signals are combined and sent through a single gain device. In some implementations the optical gain device could be a controlled by an electrical signal. In some implementations the device could be controlled by an optical signal. An example of this would be a semiconductor optical amplifier (SOA) used as an optical switch, in either a cross gain modulation (XGM) or cross phase modulation (XPM) setup. FIG. 2 shows the gain curve 200 of an SOA at a specific wavelength as a function of the total input optical power to the device. In a XGM setup the gain of the device can be controlled by an optical signal. As the power of the optical signal is varied the gain of the SOA also varies from a state with high gain 202 to a state with low gain 204. In this case the attenuation of this stage can be greater than one, and can be approximate by the function $$G(t) = \frac{g_0}{1 + \left(\sum_1^N e_n(t) + h(t)\right)/P_{sat}}$$

where $g_0$ is the small signal gain and $P_{sat}$ is the saturation power of SOA. The output of the optical bit-selection stage will be $f_n(t)$ which is equal to the product of $e_n(t)$ and $G(t)$.

The optical bit-selection stage 108, will require an appropriate signal in order to function. This signal h(t), is generated by the signal generator 110. The signal generator can consist of any device which produces a repetitive signal, and can be synchronized to the incoming data. In the case that the optical bit-selection stage requires an electrical control signal an example of a suitable signal generator would be a standard electrical function generator. In the case that the optical bit-selection stage requires an optical control signal the signal generator (as an example of a suitable signal generator) could be a light source which is modulated by a standard electrical function generator. Another example could be a pulsed laser with a controlled duty-cycle.

The final stage of the architecture is the output stage 112. This stage is responsible for any final conditioning of the signal. This stage will produce one or more outputs, each or which consists of a linear combination of one or more of $f_n(t)$. In the case of S/P conversion the output stage will consist of any devices necessary such that the output will consist of N channels, each of which contain only one of $f_n(t)$. For example, in the case where each of $f_n(t)$ is carried on a different wavelength and sent through a single optical gain device, the output stage will consist of any device which is capable of wavelength division demultiplexing. In the case of D/A conversion the output stage will consist of any devices necessary such that the output will consist of one channel which is a combination of all N signals $f_n(t)$. In the case where each of $f_n(t)$ is carried on a different wavelength and sent through a single optical gain device, there is no need for any device in the output stage as the signals have already been combined. In other configurations, each of $f_n(t)$ may be passed through a separate gain device, in which case an appropriate output stage could consist of a N×1 coupler.

Figure 3:
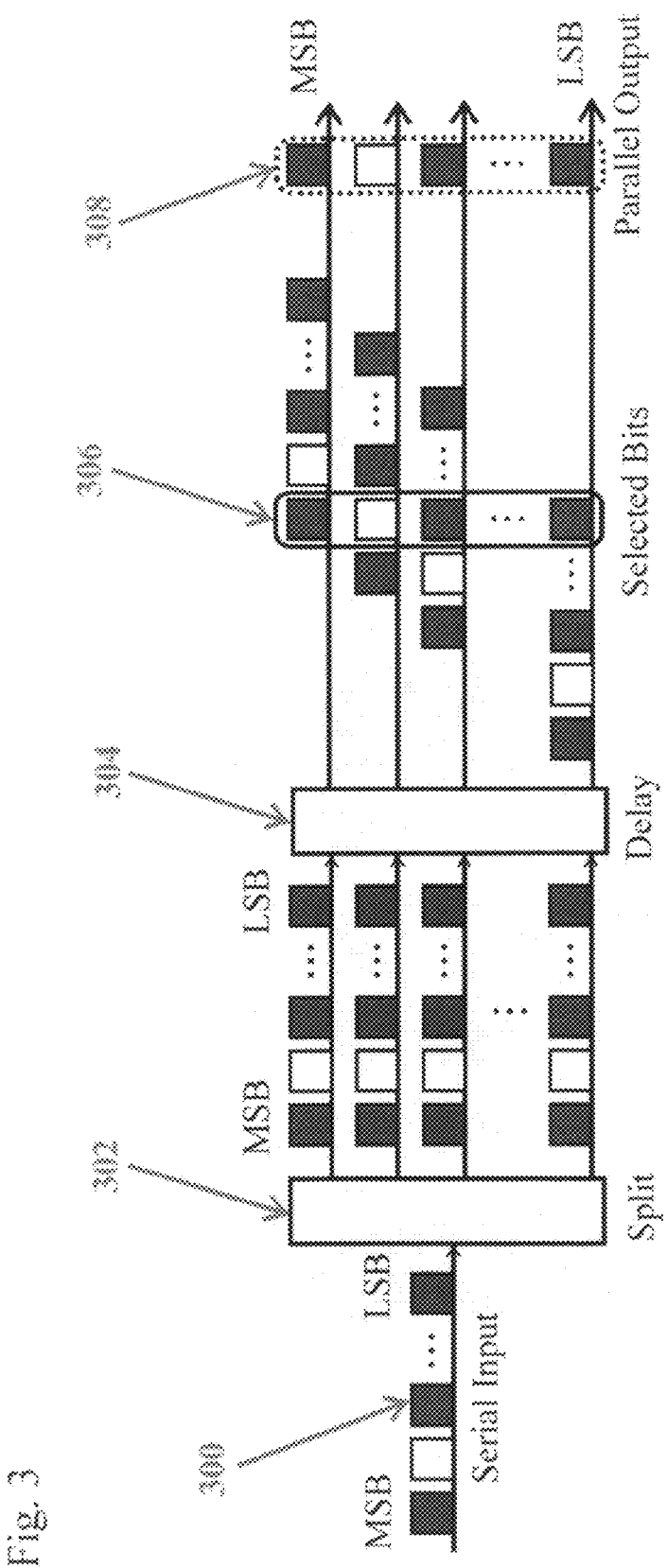
FIG. 3 is a conceptual diagram of the S/P conversion process which can be realized by certain configurations of the architecture in accordance with the present invention.

FIG. 3 shows a conceptual schematic of the S/P conversion process which can be performed by certain configurations of the optical signal processing architecture in accordance with the present invention. The S/P conversion consists of receiving a serial input 300, splitting 302 and delaying 304 the serial data, selecting one bit from each of the split signals 306, and outputting these bits in parallel 308.

Figure 4:
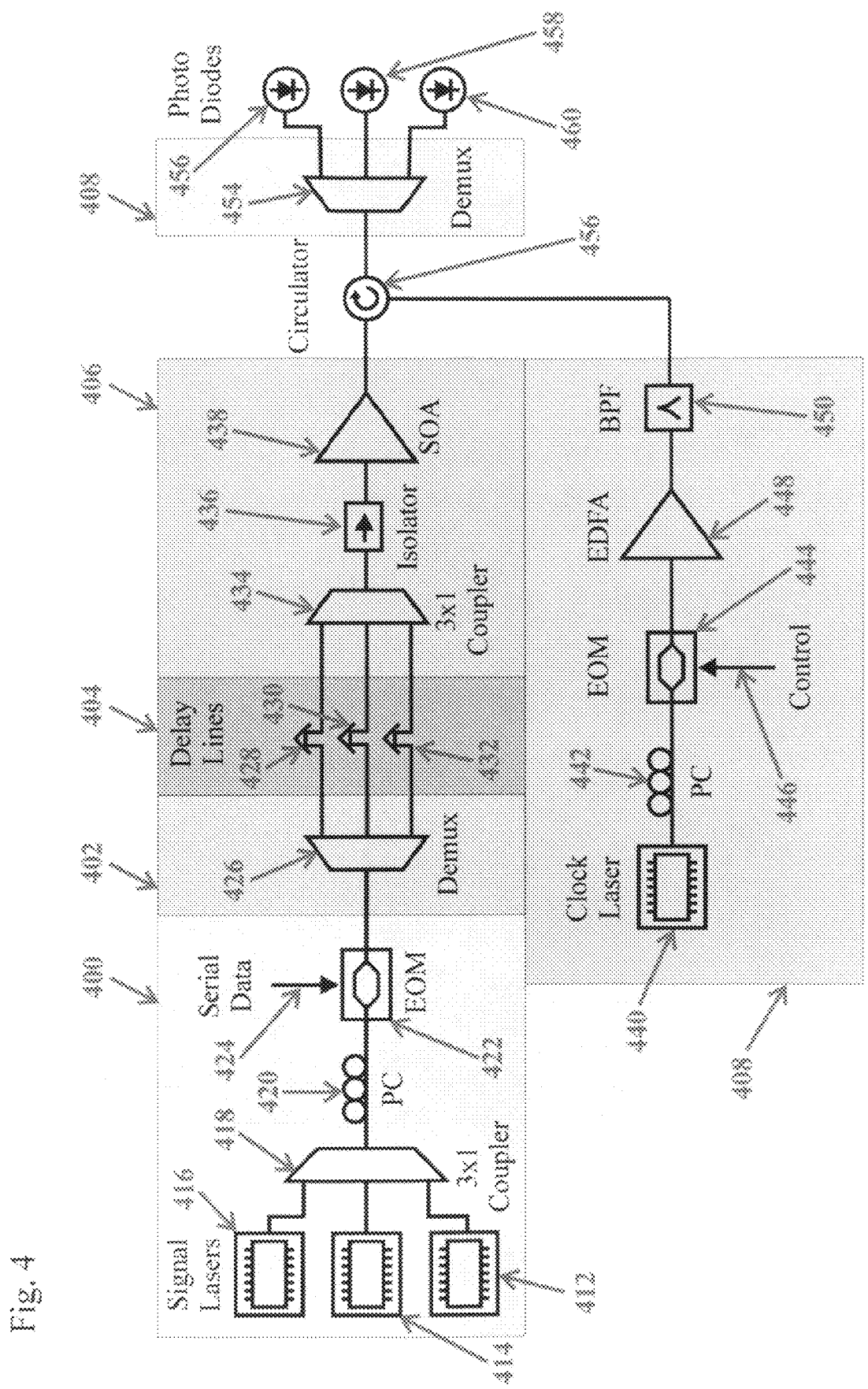
FIG. 4 is a block diagram of an embodiment of the optical processing architecture configured for S/P conversion in accordance with the present invention.

FIG. 4 illustrates one possible way of implementing the architecture to perform the S/P conversion on 3 bit digital words operation. This configuration uses wavelength division multiplexing for splitting, and XGM in an SOA for variable gain. The present invention can clearly be divided into an input stage 400, a splitting stage 402, a delay stage 404, an optical bit-selection stage 406, an output stage 408, and a signal generator 410. The fixed attenuation stage is not clearly defined in this implementation; however, the relative power of the parallel signals is controlled in the input stage.

In FIG. 4, the input stage 400 consists of three tunable diode lasers 412, 414 and 416. Each of these lasers is tuned to a different wavelength and then combined with a 3×1 coupler 418. The combined power is sent through a polarization controller 420 and an electro-optic modulator 422. The serial data 424 is generated electrically and sent to the modulator, resulting in identical serial data being carried by all three wavelengths. The splitting stage 402 consists of a DeMux which could be an arrayed waveguide grating (AWG) 426 which generates three similar signals by separating the three wavelengths. In the delay stage 404, variable optical delay lines, 428, 430 and 432, are coupled to each of the outputs of the DeMux 426. Following this, in the optical bit-selection stage 406, the three signals are recombined by a 3×1 coupler 434. They are then sent through an isolator 436 and then into the SOA 438. The gain of the SOA is controlled by the signal generator 410. The signal generator consists of a tunable diode laser 440, which is sent through a polarization controller 442 and into an electro-optic modulator 444. A function generator provides an electrical signal 446, which is converted to an optical signal by the modulator. The optical signal is then amplified by an erbium doped fiber amplifier (EDFA) 448. A narrow bandpass filter 450, allows the optical signal carrier wavelength to pass, while blocking any amplified spontaneous emission from the EDFA. Finally a circulator 452, is used to pass the optical signal into the SOA 438, propagating in the direction opposite that of the three signals carrying the serial data. These three signals pass through the circulator 452, and on to the output stage 408. In this stage a DeMux 454 separates the three optical carriers into the three outputs of the system. In FIG. 4 the outputs are then observed by photodiodes 456, 458 and 460.

Figure 5:
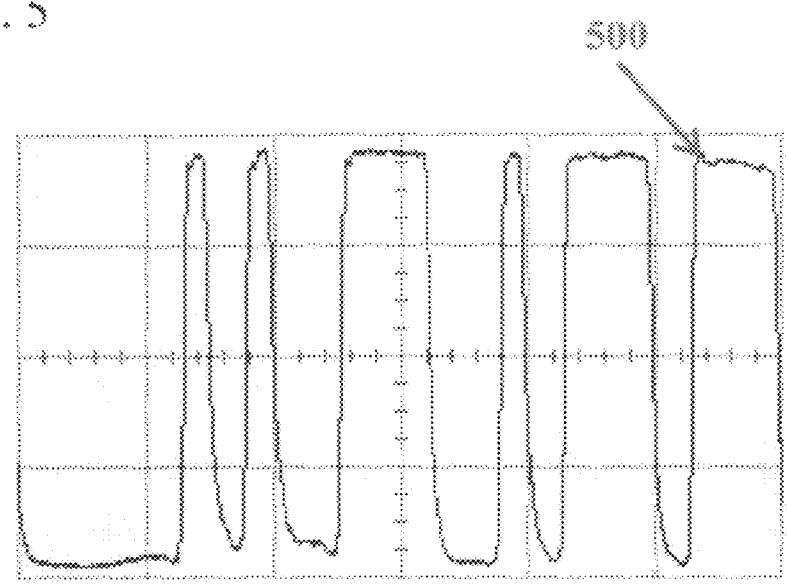
FIG. 5 is a graph showing an example of a digital serial data signal consisting of 8, 3-bit digital words representing the values 0 through 7.
Figure 6:
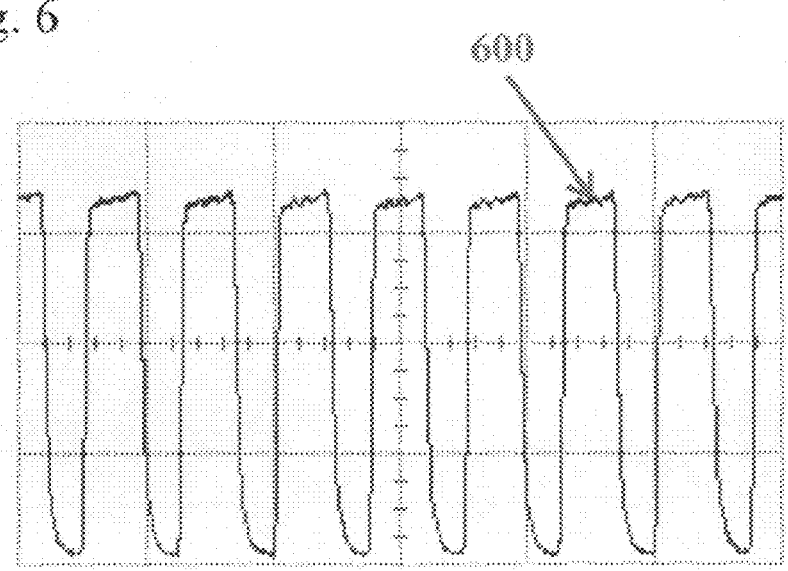
FIG. 6 is a graph showing an example of a signal generated by the signal generator to control the variable attenuation device.
Figure 7:
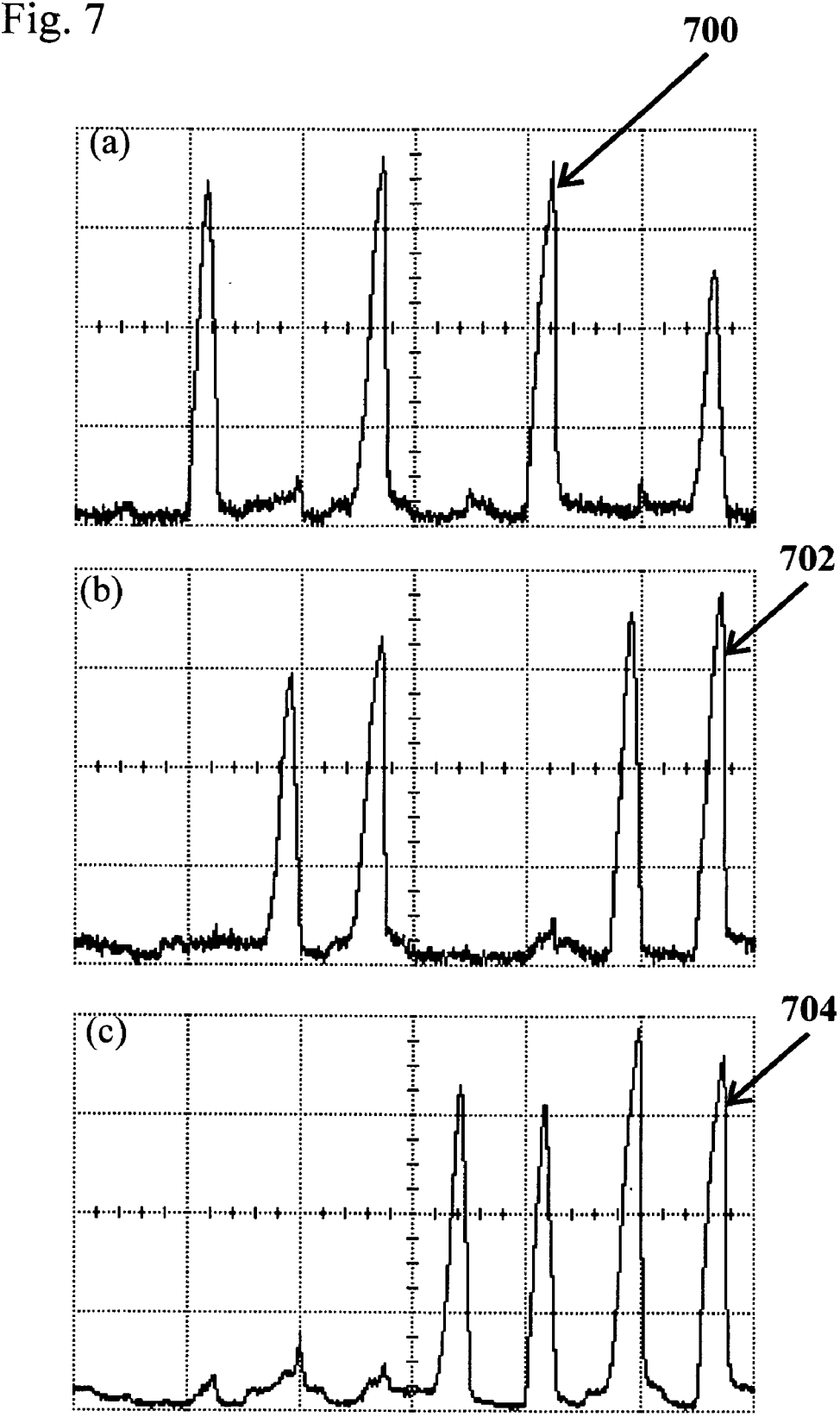
FIG. 7a is a graph showing an example of the output signal corresponding to the least significant bit with the optical processing architecture configured for 3-bit S/P conversion.
FIG. 7b is a graph showing an example of the output signal corresponding to the middle bit with the optical processing architecture configured for 3-bit S/P conversion.
FIG. 7c is a graph showing an example of the output signal corresponding to the most significant bit with the optical processing architecture configured for 3-bit S/P conversion.

FIG. 5 shows a trace 500 of a typical digital serial data input 424 which can be used as the input to the system in FIG. 4. The signal is comprised of 8, 3-bit digital words, corresponding to the values 0 through 7. FIG. 6 shows a trace 600 of the signal produced by the signal generator 410 of FIG. 4. Being a 3-bit system, the signal generator produces a signal which is high for two of the three bits, and low for the third. This results in the gain of the bit-selection stage 406 being very low for two of the three bits and high for the third. As a result this stage functions to select one bit from each of the three signals passing through the SOA 438. FIG. 7 shows the output traces 700, 702, and 704 as observed by the photodiodes 456, 458 and 460. Each of the three outputs corresponds to a different bit from the digital word input, with 700 being the LSB, 702 the middle bit, and 704 the MSB.

Figure 8:
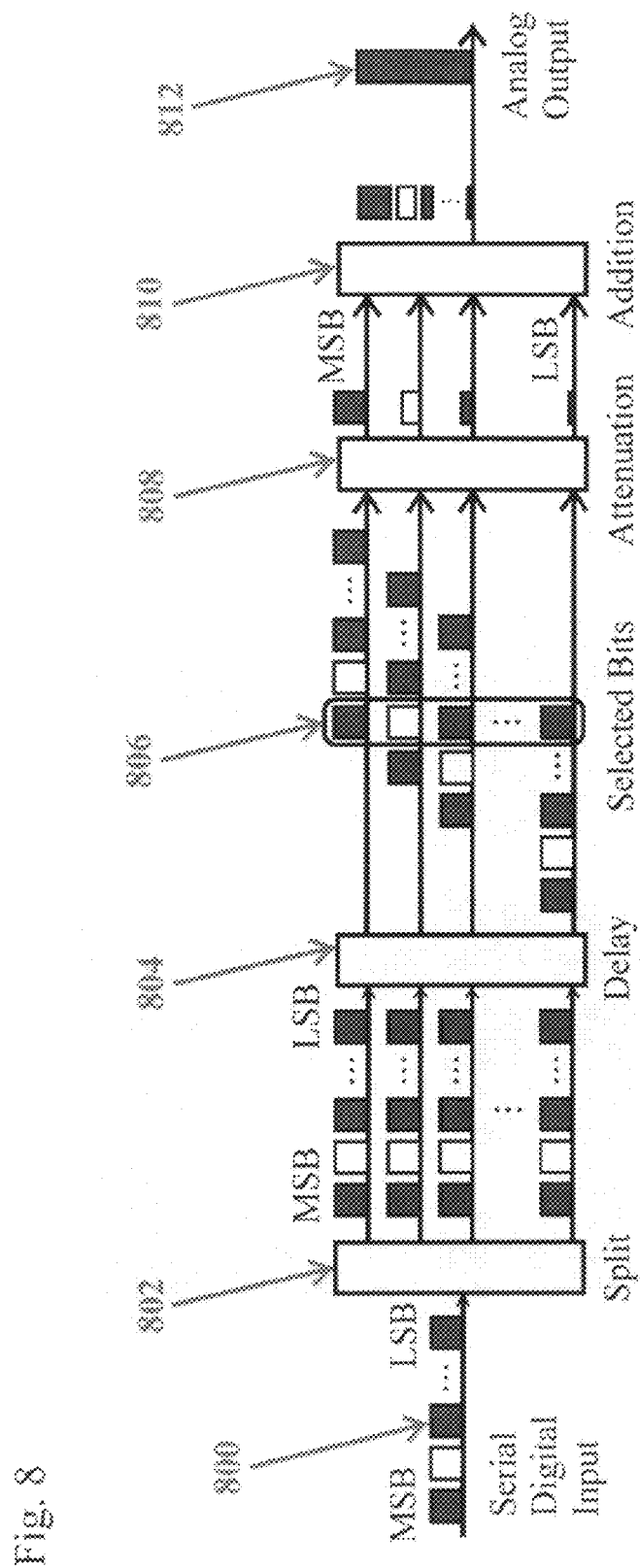
FIG. 8 is a conceptual block diagram of the S/P-D/A conversion process which can be realized by certain configurations of the architecture in accordance with the present invention.

FIG. 8 shows a conceptual schematic of the D/A conversion process which can be performed by certain embodiments of the optical signal processing architecture. The D/A conversion consists of receiving a serial input 800, splitting 802 and delaying 804 the serial data, selecting one bit from each of the split signals 806, attenuating the power of each selected bit 808, adding the bits 810 and outputting an analog signal 812.

Figure 9:
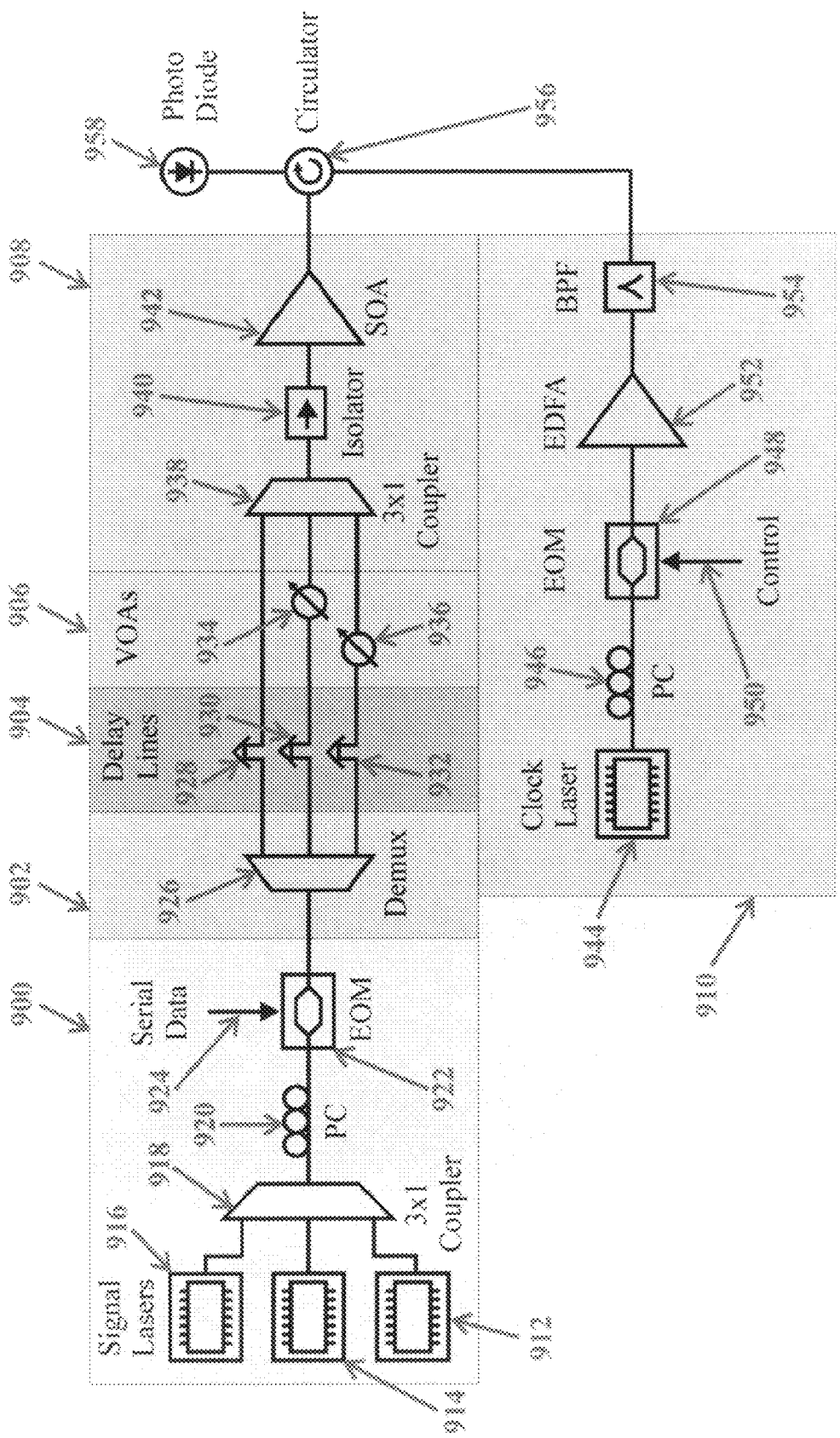
FIG. 9 is a diagram of the optical processing architecture configured for S/P-D/A conversion in accordance with the present invention.

FIG. 9 illustrates a certain embodiment of the architecture, in which it performs the operation of S/P-D/A conversion. This embodiment once again uses wavelength-division multiplexing for splitting, and XGM in an SOA for an optical bit-selection device. The system can clearly be divided into an input stage 900, a splitting stage 902, a delay stage 904, a fixed attenuation stage 906, an optical bit-selection stage 908, and a signal generator 910. In this configuration the output stage is not needed as no further operations are required on the signal leaving the bit-selection stage.

In FIG. 9, the input stage 900 consists of three laser diodes 912, 914 and 916. Each of these lasers is tuned to a different wavelength and then combined with a 3×1 coupler 918. The combined carriers are sent through a polarization controller 920 and an electro-optic modulator 922. The serial data 924 is generated electrically and sent to the modulator, resulting in identical serial data being carried by all three carrier wavelengths. The splitting stage 902 consists of a DeMux 926 which generates three similar signals by separating the three wavelengths. In the delay stage 904, variable optical delay lines, 928, 930 and 932, are coupled to each of the outputs of the DeMux 926. In the fixed attenuation stage 906, variable optical attenuators 934 and 936 are coupled to delay lines 930 and 932 respectively. Each attenuator is adjusted prior to system operation, such that the signal passing through delay line 928 will have a relative power four times that of the signal passing through delay line 932, and a power twice that of the signal passing through delay line 930. Following this, in the optical bit-selection stage 908, the three signals are recombined by a 3×1 coupler 938. They are then sent through an isolator 940 and then into the SOA 942. The gain of the SOA is controlled by the signal generator 910. The signal generator consists of a tunable diode laser 944, which is sent through a polarization controller 946 and into an electro-optic modulator 948. A function generator provides an electrical signal 950, which is converted to an optical signal by the modulator. The optical signal is then amplified by an EDFA 952. A narrow bandpass filter 954, allows the optical signal carrier wavelength to pass, while blocking any amplified spontaneous emission from the EDFA. Finally a circulator 956 is used to pass the optical signal into the SOA 942, propagating in the direction opposite that of the three signals carrying the serial data. After passing through the circulator 956, the three signals are already combined, as required in the D/A conversion method of FIG. 8. As a result there is no need for an output stage, and the combined power of the three signals can be detected by a photodiode 958.

Figure 10:
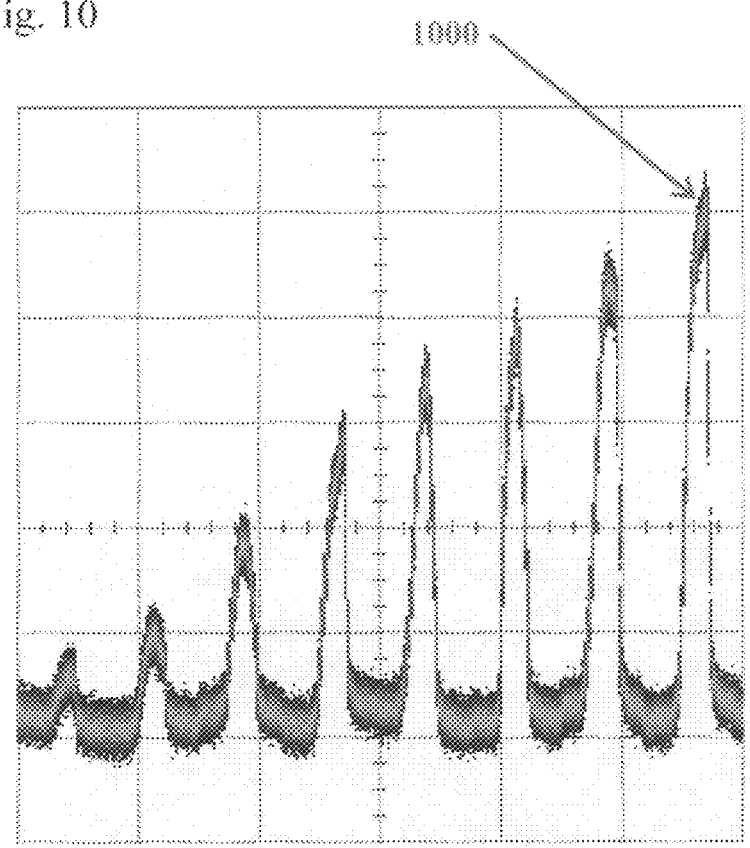
FIG. 10 is a graph showing an example of the analog output signal corresponding to the values 0 through 7 with the optical processing architecture configured for D/A conversion in accordance to the embodiment of FIG. 9.

FIG. 10 is a graph showing the output of the system in FIG. 9, when provided the digital serial input data of FIG. 5. The eight pulses shown in FIG. 10 have increasing amplitude, corresponding to the values 0 through 7. The system of FIG. 9 produces a small offset in each pulse as a result of amplified spontaneous emission from the SOA. In certain embodiment an output stage consisting of a proper bandpass filter is used to pass the analog signal while blocking the amplified spontaneous emission.

Figure 11:
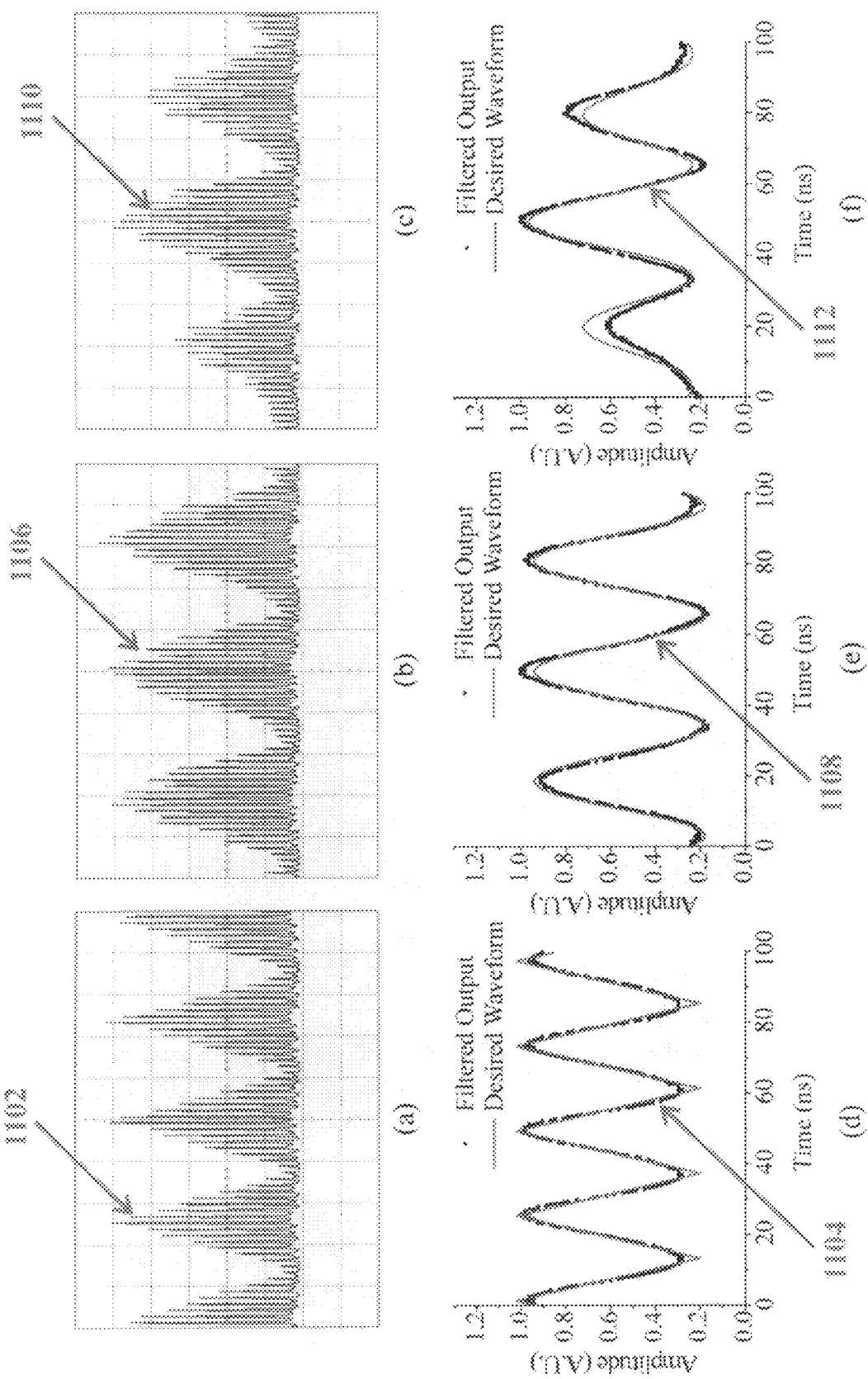
FIG. 11a is a graph showing an example of a triangle wave output signal generated with the optical processing architecture configured for D/A conversion in accordance to the embodiment of FIG. 9.
FIG. 11b is a graph showing an example of a sinusoidal wave output signal generated with the optical processing architecture configured for D/A conversion in accordance to the embodiment of FIG. 9.
FIG. 11c is a graph showing an example of a modulated sinusoidal wave output signal generated with the optical processing architecture configured for D/A conversion in accordance to the embodiment of FIG. 9.
FIG. 11d is a graph showing the triangle wave output from FIG. 10a after passing through a low pass filter in order to recover the original signal in accordance to the embodiment of FIG. 9.
FIG. 11e is a graph showing the sinusoidal wave output from FIG. 10b after passing through a low pass filter in order to recover the original signal in accordance to the embodiment of FIG. 9.
FIG. 11f is a graph showing the modulated sinusoidal wave output from FIG. 10c after passing through a low pass filter in order to recover the original signal in accordance to the embodiment of FIG. 9.

FIG. 11 contains several examples of arbitrary waveform generation using the optical processing architecture in accordance to the embodiment of FIG. 9. FIG. 11a shows a triangular waveform 1102 generated with the system. FIG. 11b shows the same waveform after passing through a low pass filter 1104. FIG. 11c shows a sinusoidal waveform 1106 generated in accordance to the embodiment of FIG. 9. FIG. 11d shows the same waveform after passing through a low pass filter 1108. FIG. 11e shows a sinusoidal waveform with amplitude modulation 1110 in accordance to the embodiment. FIG. 11f shows the same waveform after passing through a low pass filter 1112.

The invention claimed is:

1. An N-bit optical signal processing architecture comprising: an input stage which receives and conditions digital serial data in sets of N-bit digital words; a splitting stage to divide the received data signal into N similar data signals; a delay stage allowing the introduction of relative delays between the N data signals; a fixed attenuation stage consisting of N fixed attenuators; a bit selection stage consisting of one or more devices for which the gain can be rapidly changed by an external signal; a signal generating device configured to be synchronized with the received serial data and connected in such a way as to control the gain device(s) of the bit selection stage; a summing and output stage which performs summing of the N weighted bits and final conditioning to produce one analog output signal for each input digital word.

2. The device of claim 1, wherein the received digital serial data is an electrical signal and the input stage converts the electrical signal to an optical signal.

3. The device of claim 1, wherein the received digital serial data is an optical signal.

4. The device of claim 1, wherein the delay stage is configured such that the $n^{th}$ signal has a delay of $(\tau_{bit} \times n + \tau_0)$, where $\tau_{bit}$ is the period of one bit and $\tau_0$ is some arbitrary delay common to all N signals.

5. The device of claim 1, wherein the fixed attenuators are adjusted such that the $n^{th}$ signal has a relative power of $2^{(n-1)}$ upon reaching the output stage.

6. The device of claim 1, wherein the fixed attenuators are adjusted such that the $n^{th}$ signal has a relative power of $2^{(N-n)}$ upon reaching the output stage.

7. The device of claim 1, wherein the optical power levels are monitored, and the attenuators of the fixed attenuation stage are actively adjusted by a feedback loop to maintain desired optical-power levels.

8. The device of claim 1, wherein the splitting device is a 1×N coupler, and a separate controllable gain device is implemented for each of the N signals.

9. The device of claim 1, wherein the input stage duplicates the received serial data across N carrier wavelengths, the splitting device is a 1×N wavelength division multiplexor, the optical bit-selection stage consists of a single controllable gain device.

10. The device of claim 1, wherein the optical bit-selection stage is controlled by an electrical signal, and the signal generating device produces an acceptable electrical signal.

11. The device of claim 1, wherein the optical bit-selection stage is controlled by an optical signal, and the signal generating device produces an acceptable optical signal.

12. The device of claim 1, wherein the optical bit-selection stage consists of one or more semiconductor optical amplifiers with a gain controlled through cross gain modulation by an optical signal from the signal generating device.

13. An optical method of converting N-bit serial data to parallel data comprising the steps of: receiving a digital serial data signal, splitting the received signal into N similar digital serial data signals, creating a time delay in each of the digital serial data signals such that the $n^{th}$ digital serial data signal is delayed by n bits, selecting one bit from each of the digital serial data signals at the same time to produce a digital parallel data signal.

14. An optical method of converting N-bit serial data to an analog signal comprising the steps of: receiving a digital serial data signal, splitting the received signal into N similar digital serial data signals, creating a time delay in each of the digital serial data signals such that the $n^{th}$ digital serial data signal is delayed by n bits, attenuating each signal such that the $n^{th}$ digital serial data signal has a relative power of $2^{(n-1)}$, selecting one bit from each of the digital serial data signals at the same time to produce a parallel data signal, combining the N bits from the parallel signals to produce an analog signal.

15. An optical method of converting N-bit serial data to an analog signal comprising the steps of: receiving a digital serial data signal, splitting the received signal into N similar digital serial data signals, creating a time delay in each of the digital serial data signals such that the $n^{th}$ digital serial data signal is delayed by n bits, attenuating each signal such that the $n^{th}$ digital serial data signal has a relative power of $2^{(N-n)}$, selecting one bit from each of the digital serial data signals at the same time to produce a parallel data signal, combining the N bits from the parallel signals to produce an analog signal.

16. The device of claim 1 can generate an arbitrary optical/electrical analog waveform by combining the N-bits from a digital input.

* * * * *